United States Patent
Rossmy et al.

(10) Patent No.: US 6,605,351 B1
(45) Date of Patent: Aug. 12, 2003

(54) AMPHIPHILIC PARTICLES OR MOLECULES WITH PREDOMINANTLY HYDROPHILIC AND PREDOMINANTLY HYDROPHOBIC DOMAINS DISTRIBUTED ANISOTROPICALLY ON THEIR SURFACE

(76) Inventors: Gerd Rossmy, Im Hadkamp 18, D-45721 Haltern (DE); Peter Gimmnich, Stemmering 2, D-45259 Essen (DE); Burghard Grüning, Waldsaum 11, D-45134 Essen (DE); Helmut Schator, Breilsort 14, D-45144 Essen (DE); Joachim Venzmer, Leinwebermarkt 4, D-45239 Essen (DE)

(*) Notice: Subject to any disclaimer, the term of this patent is extended or adjusted under 35 U.S.C. 154(b) by 0 days.

(21) Appl. No.: 09/509,390
(22) PCT Filed: Sep. 24, 1998
(86) PCT No.: PCT/EP98/06086
§ 371 (c)(1),
(2), (4) Date: Mar. 24, 2000
(87) PCT Pub. No.: WO99/16834
PCT Pub. Date: Apr. 8, 1999

(30) Foreign Application Priority Data

Sep. 27, 1997 (DE) .......................... 197 42 761

(51) Int. Cl.[7] .................................. B32B 5/16
(52) U.S. Cl. .................................. 428/403; 428/405
(58) Field of Search .................. 428/403, 405

(56) References Cited

U.S. PATENT DOCUMENTS

| 3,549,396 A | 12/1970 | Dietz | |
| 4,715,986 A | * 12/1987 | Gruning et al. | .......... 252/315.2 |
| 4,844,980 A | 7/1989 | Grüning et al. | |
| 5,686,054 A | * 11/1997 | Barthel et al. | .............. 423/335 |
| 5,851,715 A | * 12/1998 | Barthel et al. | .............. 430/110 |
| 6,190,814 B1 | * 2/2001 | Law et al. | .................. 430/110 |

FOREIGN PATENT DOCUMENTS

| DE | 2107082 | 8/1971 |
| DE | 2313073 | 9/1974 |
| DE | 3132370 | 3/1983 |
| EP | 0156270 | 2/1985 |
| EP | 0686391 | 12/1995 |
| WO | 8908621 | 9/1989 |
| WO | 9506518 | 3/1995 |

* cited by examiner

*Primary Examiner*—H. Thi Le
(74) *Attorney, Agent, or Firm*—Sidley Austin Brown & Wood, LLP

(57) ABSTRACT

The invention relates to essentially water-insoluble amphiphilic particles or molecules having predominantly hydrophilic and predominantly hydrophobic domains distributed anisotropically over their surface and a particle size ranging from 1 nm to 100 $\mu$m, consisting of antagonistic partial amounts of particles or molecules, which in each case have predominantly hydrophilic or predominantly hydrophobic domains, the partial amounts of the particles or molecules being agglomerated or associated over polar interactions or hydrogen bonds, as well as to a method for producing these particles or molecules and to the selective use of the particles or molecules.

17 Claims, 1 Drawing Sheet

AMPHIPHILIC PARTICLES OR MOLECULES WITH PREDOMINANTLY HYDROPHILIC AND PREDOMINANTLY HYDROPHOBIC DOMAINS DISTRIBUTED ANISOTROPICALLY ON THEIR SURFACE

FIELD OF INVENTION

The invention relates to essentially water-insoluble amphiphilic particles or molecules having predominantly hydrophilic and predominantly hydrophobic domains distributed anisotropically over their surface and a particle size ranging from 1 nm to 100 μm, to methods for producing these particles or molecules and to the selective use of the particles or molecules.

BACKGROUND INFORMATION AND PRIOR ART

The hydrophilic or hydrophobic behavior of a solid is determined essentially by the groups located at its surface. For example, particles or molecules, which have hydroxyl groups at the surface, usually are hydrophilic. Such a behavior is observed, for example, by finely divided silica, which has been obtained by precipitation or pyrolytic means. If, however, there are alkylsilyl groups or hydrocarbon groups, such as alkyl groups and, in particular, long-chain alkyl groups, at the surface of the particles or molecules, the particles have hydrophobic properties.

It has long been known that the hydrophilic or hydrophobic character of inorganic or organic particles or molecules can be varied. This can be done by adsorbing substances at the surface of a particle or molecule and especially by chemical reactions with reactive groups, which are at the surface of the particle or molecule. There is an extensive literature under the keyword "silane adhesive". It deals with this state of the art, especially for treating glass surfaces with alkylsilyl compounds.

For example, in the German Offenlegungsschrift 23 13 073, a method is disclosed for chemically modifying the surfaces of inorganic hydroxyl group-containing solids with the distinguishing feature that alkyl chains, which have reactive hetero atoms, are linked chemically to these surfaces.

It is illuminating that, by such a modification of the surface, the suitability of solids, modified in this manner, to function as a stationary phase in chromatography can be influenced significantly, since the physical and chemical behavior of the modified solid, with respect to the mobile phase, is determined essentially by the properties at its surface. On the basis of the modifying reaction and the intended use, it may be assumed that the whole surface of the particles participates in the modifying reaction. If the modifying agent is used in a sub-stoichiometric amount, so that some of the reactive groups, which are at the surface of the particles, cannot be modified, it may be assumed that the modified groups are distributed randomly on the surface.

The object of the German Offenlegungsschrift 21 07 082 is a surface-treated powdered silicon dioxide with a surface area of at least 10 m$^2$/g, which is characterized by the fact that it has a degree of hydrophobicity, measured by the methanol titration test, of 5 to 35. The methanol titration test, the result of which is also referred to as a methanol number, provides a frequently used parameter for determining the degree of hydrophobicity. The test is carried out by adding 0.2 g of the powder, which is to be tested, to 50 mL of water, which is in a conical 250 mL flask. If the powder has a hydrophobic surface, it is not wetted by the water and floats on the surface. Methanol is now added slowly from a burette, until the whole of the powder, which is to be tested, is wetted. The end point marks the point in the addition of methanol, at which practically the whole of the powder is suspended in the liquid. The methanol number is then the percentage of methanol in the liquid mixture of methanol and water when the end point is reached.

In the aforementioned German Offenlegungsschrift 21 07 082, the silicon dioxide powder is made hydrophobic by treating the surface with a silane, which contains groups, which are reactive with respect to the hydroxyl groups of the silica, as well as hydrophobic groups. By the reaction of the hydroxyl groups at the surface of the silicon dioxide with the reactive groups of the silane, the particles are modified in such a manner, that the hydrophobic groups of the silane are aligned on the outside. Methyltriethoxysilane is an example of such a reactive silane. It is also mentioned in this Offenlegungsschrift that the hydrophilic groups are distributed randomly, that is, that the coverage of the surface proceeds according to statistical laws, so that the probability of encountering a hydrophilic group or a hydrophobic group on the surface of a modified particle is the same everywhere and depends on the concentration of these groups.

In the German Offenlegungsschrift 31 32 370, a method is described for recovering tertiary crude oil by flooding with surfactants. For this method, an effective amount of a silicon dioxide, the surface of which is modified, is added to the surfactant-containing aqueous liquid.

It is a common feature of all of these modified particles of the state of the art that the hydrophilicity or hydrophobicity of the surface has been modified selectively, in order to provide the particles with certain properties, which are desirable in applications. These application properties are based, in particular, on the improved compatibility and wettability of the particles with or by the medium respectively, in which the particles are located. The solids, known from this state of the art and having modified surface properties, have hydrophobic or hydrophilic groups, which are distributed uniformly randomly, that is, isotropically on the surface of the particles. It is thus only possible to make a hydrophilic particle more or less hydrophobic or vice versa. This is shown by the distribution of the particles between two immiscible liquids. If a layer of hexane, as an example of a nonpolar liquid, is placed above a layer of water as a polar liquid, and pyrogenic silica, the surface of which is untreated, is added, the untreated pyrogenic silica, because of the presence of hydroxyl groups at its surface, is distributed almost exclusively in the water phase. If the silica is hydrophobized by one of the methods named above, so that practically all the hydroxyl groups are modified and any hydroxyl groups remaining are sterically shielded so that their contribution to the surface properties is negligible, a silica, so hydrophobized, is distributed practically exclusively in the hexane phase. However, if pyrogenic silica is hydrophobized only partially and to a different extent, the degree of hydrophobicity being determined, for example, by the methanol number, distributions between the two phases, which correlate with the degree of hydrophobization, are obtained.

The EP 0 156 270 A2 relates to particles, which are smaller than 100 μm and are modified by hydrophilic and hydrophobic groups. The hydrophilic and hydrophobic groups are distributed anisotropically on the surface of the modified particles. The EP 0 156 270 A2 also relates to methods for producing such particles and to their use as surface-active products, especially for stabilizing or de-stabilizing emulsions and foams, as well as for recovering tertiary crude oil. One embodiment relates to particles, for which partial amounts of particles, modified hydrophobically, and partial amounts of particles, modified hydrophilically, are chemically linked together.

The FR 9406899 (EP 0 686 391 A1) discloses that polyalkylsilsesquioxanes, such as Tospearl® 103, 105, 108 (Toshiba), stabilize a water-in-oil emulsion. The surface of these particles has hydrophobic properties, the particles having alkyl chains containing up to 4 carbon atoms at the surface. The surface of these polyalkylsilsesquioxanes is dominated, on the one hand by the hydrophobic alkylsilyl groups and by a few hydrophilic SiOH groups. As the size of the particles increases, the hydrophobic character of the particles also increases. Likewise, the stabilizing effect of pyrogenic, hydrophobic silica, such as Aerosil® 974, 812 and 805 (Degussa), on water-in-oil emulsions is described. In this case, the diameter of the primary particles should be between 7 and 12 nm.

OBJECT OF THE INVENTION

It is an object of the invention to produce associates or agglomerates of particles or molecules, which are hydrophilic or modified hydrophilically, and particles or molecules, which are hydrophobic or are modified hydrophobically, and optionally to isolate the associates or agglomerates and use them as emulsifiers for interfacial modifications, for example, water-in-oil or oil-in-water emulsions. Said particles or molecules should interact with one another over polar interactions or hydrogen bonds and these physical interactions should lead to new, inventive particles or molecules, which do not, however, exhibit any chemical linkage of partial amounts of the particles or molecules with hydrophobic or hydrophilic domains.

SUMMARY OF THE INVENTION

In a first embodiment of the invention, the objective above is accomplished by amphiphilic particles or molecules, which have a particle size of 1 nm to 100 µm, are substantially insoluble in water, have predominantly hydrophilic and predominantly hydrophobic domains distributed anisotropically over their surface and consist of antagonistic partial amounts of particles or molecules, which in each case have predominantly hydrophilic or predominantly hydrophobic domains, the partial amounts of the particles or molecules being agglomerated or associated over polar interactions or hydrogen bonds.

DETAILED DESCRIPTION

Figure 1:
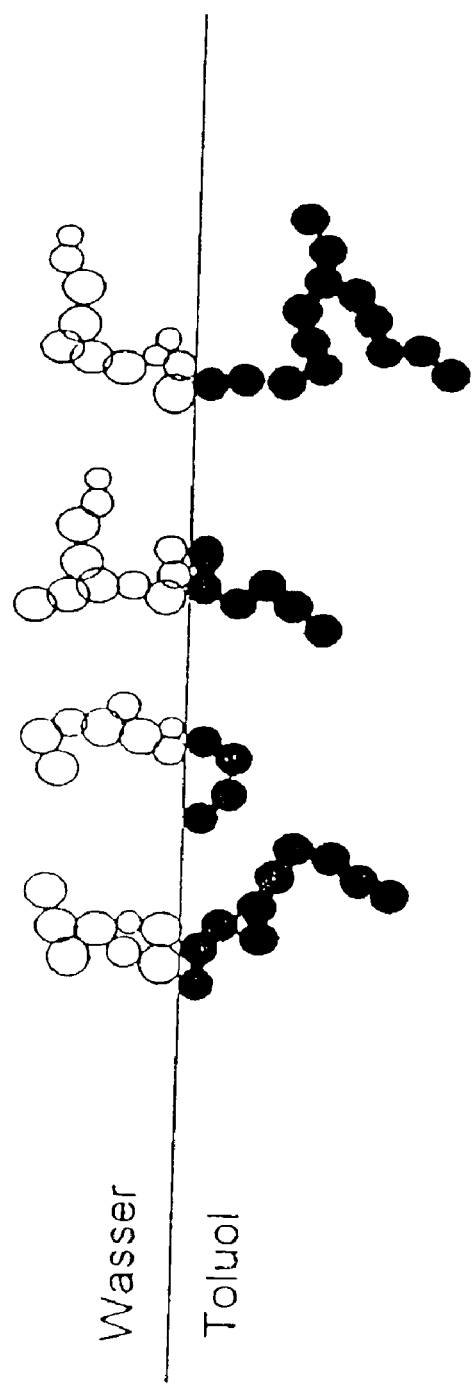
FIG. 1 shows an idealized representation of the inventive particles or molecules and their alignment at a phase boundary.

Pursuant to the invention, it was found that this objective can be accomplished, on the one hand, with the help of starting particles or molecules, which are used to form associates or agglomerates and have predominantly hydrophilic domains, that is, have regions, in which the surface hydroxyl groups or other hydrophilic groups, such as NH groups, are not modified or at least partially modified with hydrophilizing groups. The partial amounts of these particles necessarily have groups, which are capable of coupling and suitable for the formation of polar interactions or hydrogen bonds.

The other partial amounts of the particles or molecules, which are used for the inventive associates or agglomerates, have hydrophobic domains, that is, have regions, which originally contained hydrophobic groups or are modified by hydrophobic groups. At least in partial regions, this partial amount also must have polar groups, which are suitable for the formation of polar interactions or hydrogen bonds. In both cases, hydrogen acceptors or donors come into consideration here, which are particularly suitable for the formation of hydrogen bonds.

It is an essential criterion of the present invention that the partial amounts of the particles or molecules mentioned enter into interactions by hydrogen bonding or polar interactions.

To produce the inventive particles or molecules, the respective partial amounts of the particles or molecules preferably are added, for example, to a phase boundary, for example, in an inert solvent mixture of, especially, hydrocarbons, such as toluene, and water and the two partial amounts of the particles or molecules are brought into mutual contact, if necessary, by the action of shear forces. It should be noted here that the presence of the phase boundary is not absolutely essential. Since some of the hydrophilic groups at the surface of the particles or molecules are not modified, the particles can interact with other particles, for example, over polar interactions or hydrogen bonds. This physical interaction leads to new associates or agglomerates of the inventive particles or molecules, which are retained even after isolation from the solvent and exert their effect, for example, during use as an emulsifier. On the other hand, the inventive particles or molecules can also be used directly as a suspension. FIG. 1 shows an idealized representation of the inventive particles or molecules and their alignment at a phase boundary. The parts of the molecules or particles, which have predominantly hydrophobic domains, are aligned in the nonpolar toluene phase, while the parts of the molecules or particles, having predominantly hydrophilic domains, are aligned in the polar water phase.

For the idealized representation, it is assumed that the hydrogen bonding or polar interaction takes place particularly at the phase boundary. In practice, however, partial amounts of components, having hydrophilic domains, will also be found in the nonpolar phase and vice versa.

The success of the inventive restructuring of particles or molecule clusters can be ascertained with the help of the methanol titration test. Depending upon the ratio in which the partial amounts of particles or molecules are mixed, products are obtained, for example, which can be characterized with a particular methanol number. Products with a methanol number between 0 and 35 are suitable, in particular, for stabilizing oil-in-water emulsions, while products with a methanol number between 35 and 60 are suitable, in particular, for stabilizing water-in-oil emulsions.

This means that the surface of the inventive particles or molecules is changed anisotropically not only with respect to their affinity for polar and nonpolar solvents, but that the particles, particularly at phase boundaries, achieve effects similar to those achieved by surfactants. However, in contrast to conventional surfactants, the inventive particles or molecules usually are insoluble in the system and can therefore be removed from the system easily by filtration, centrifugation or similar measures. By these means, a new class of quasi surface-active products is made available, which have various industrial uses. Moreover, the production of the inventive particles or molecules is much simpler and, with that, more cost effective than that of particles obtained according to the EP 0 156 270 A2.

The essence of the invention thus consists therein that, in contrast to the predominant state of the art, the hydrophilic and hydrophobic domains on the surface of the particles or molecules are not distributed isotropically according to statistical laws. Instead, the particles or molecules have regions of different hydrophilicity or hydrophobicity, which are separated from one another. The hydrophilic and hydrophobic domains thus occur in surface regions of the particles or molecules, which are separated from one another. Moreover, the individual domains may be disposed in one area and adjoin one another. The hydrophobic or hydrophilic domains do not have to be uniformly pronounced. It is, however, a prerequisite for the inventive particles or molecules that these domains be of an antagonistic nature.

It is known that soluble surfactant compounds must contain hydrophilic and hydrophobic groups in the same molecule, if they are to be surface active. The essence of the invention can therefore also be seen to lie therein that the arrangement of the hydrophilic and hydrophobic domains is transferred from the low molecular weight range of the surfactants into the range of solid particles, which are about 1 nm to 100 μm in size. In this connection, it is obvious that the inventive particles or molecules have at least one hydrophilic and one hydrophobic domain. However, the number of domains does not have a maximum.

It was surprising that, in comparison with the low molecular weight range, these relatively coarse, insoluble particles or molecules also exhibit, in a pronounced way, properties, which are characteristic of surface active compounds, such as the absorption at an oil/water phase boundary.

The inventive particles or molecules, optionally in combination with conventional surfactants, which may be present in cavities or cages of the particles or molecules, are suitable for instance, for the production of relatively coarse emulsions, which are nevertheless stable for months. They can be used to stabilize foams. They are suitable for use in suspension polymerization and for encapsulating compounds. If necessary, provisions can be made to provide the particles or molecules with windows, in order to ensure an exchange of the surfactants. The inventive particles or molecules are also suitable for the separation of oil from oil fields for the tertiary recovery of crude oil. Those skilled in the art will know that the properties of the inventive particles of molecules in mixtures of polar and nonpolar systems are different depending on the balance of the hydrophilic and hydrophobic domains.

For surfactants, that is, for soluble compounds, this hydrophilic/hydrophobic equilibrium is frequently expressed by the so-called HLB value.

Even though the inventive particles or molecules are insoluble in water and generally also in organic solvents, they can nevertheless be compared with soluble surfactants and a certain similarity may be noted in the dependence of their behavior on the hydrophilic/hydrophobic balance.

The inventive particles or molecules may be inorganic or organic. Inorganic solids are preferred, particularly silica in finely divided form, such as pyrogenic silica. The finely divided oxides or oxide hydrates of magnesium, calcium, aluminum, yttrium, the lanthanides, titanium, zirconium and tin can also be used. Carbon, for example, in the form of carbon black, can be used as a further solid. The polyalkylsilsesquioxanes, which are known in the art and subjected to the inventive treatment, are an example of the inventive molecules. As organic compounds, natural or synthetic products, such as polysaccharides, especially starch and cellulose, or organic polymeric compounds with reactive groups come into consideration. In the case of silica and finely divided oxides or oxide hydrates, the reactive groups on the surface of the particles are hydroxyl groups. When carbon black is used, these tasks can be taken over by carboxyl groups or also by phenolic hydroxy groups, which are present in the surface or introduced there. The reactive groups of the polysaccharides once again are hydroxyl groups. In the case of organic polymeric compounds, the choice of reactive groups is relatively unrestricted, since various polymers are known, which contain hydroxyl, carboxyl, mercapto or other reactive groups.

Known techniques may be employed for hydrophilizing and hydrophobizing the partial amounts of the particles or molecules. As already described above, polyoxyethylene groups, which form the hydrophilic domains, are generally used as hydrophilizing groups. It is, of course, possible to replace a portion of the ethylene oxide groups by propylene oxide groups. By these means, the hydrophilicity of these polyoxyalkylene groups can be scaled. However, not more than 50 to 60 mole percent of the ethylene oxide groups should be replaced by propylene oxide groups, as otherwise the hydrophilicity of the polyoxyalkylene group would be weakened too much.

Also corresponding to the state of the art, the hydrophobizing groups, which form the hydrophobic domains, can be hydrocarbon groups. In this connection, especially alkyl groups, alkylsilyl groups and preferably those with more than three carbon atoms in the alkyl group, come into consideration. In particular, alkyl groups derived from fatty acids or fatty alcohols with 10 to 22 carbon atoms are available. Instead of alkyl groups, aryl groups can also be used for the hydrophobizing. The aforementioned groups optionally may be substituted. A special hydrophobizing and oleophobizing is achieved by the incorporation of perfluorinated alkyl groups. Within the sense of the present invention, the incorporation of alkylsilyl groups, which are selected from alkyl-modified siloxanes, such as dimethylsilane, trimethylsilane, octylsilane or dodecylsilane, is particularly preferred.

The hydrophilic and hydrophobic groups must have at least one reactive group, by means of which they are linked to the reactive groups at the surface of the starting particles or molecules. The hydrophilic and/or hydrophobic groups are connected with the respective matrix, for example, by —CO—, —SiO—, —COO—, —NHCOO— or —NHCO— bonds. Other bridging elements are also possible. For the present invention also, this is not of decisive importance, since the essence of the invention lies less in the selection of the hydrophilizing and hydrophobizing groups and the manner in which they are connected to the matrix of the particles or molecules, than in the spatial distribution of the domains.

The methods for producing the particles or molecules are a further object of the invention. For these methods, a partial amount of particles or molecules is partially hydrophilized in a known manner and a further partial amount of particles or molecules is partially hydrophobized in a known manner and the resulting amounts of particles or molecules are brought into contact, optionally at a phase boundary, for example, under the action of shear forces. Alternatively, it is of course possible to react appropriate, commercially available particles or molecules directly. New agglomerates or associates are formed especially at phase of boundaries by the action of shear forces on the modified silicas. The particles or molecules, which have hydrophilic or hydrophobic domains, are agglomerated or associated by polar interactions or hydrogen bonds. The aforementioned shear forces can be realized, for example, by the use of stirrers operating according to the rotor-stator principle or, for example, also by the action of ultrasound. In general, pursuant to the invention, it is achieved that the partial amounts of the starting particles having predominantly hydrophobic domains still contain hydrophilic groups such as OH or NH groups, the density of which can optionally be increased by known methods, so that they can enter into the desired interactions with other partial amounts, which also have polar groups. Due to the action of shear forces on silicas, primary particles of the order of 5 to 15 nm are released by the clusters present, which generally are of the order of 0.5 to 1 μm. These primary particles are then reorganized with the help of the present invention.

The manufacturing methods can be explained better by means of an example.

Pyrogenic silica, for example, is used as solid particles. A partial amount of this silica is hydrophilized according to the state of the art with a silane, containing polyoxyethylene groups, such as that described by the formula $$R^2O(C_2H_4O)_n\text{—}R^4\text{—}Si(R^3)_{3-a}(OR^1)_a$$

The second partial amount of silica is hydrophobized also according to the state of the art by a partial reaction of the hydroxyl groups.

There are now two partial amounts of silica, one of which has hydrophilic domains and the other hydrophobic domains. Pursuant to the invention, these partial amounts are brought into contact with one another at a phase boundary, preferably a phase boundary between water and an organic compound. This phase boundary should be as large as possible, since the reorganization of the particles preferentially takes place here.

Finely divided aluminum oxide hydrate or finely divided starch, such as swelling starch, can be hydrophobized similarly. The properties of the particles or molecules produced are determined by the particle size and especially by varying the hydrophobic substituents with respect to their structure and molecular weight and with respect to the amount applied, and adapted to the respective requirements of the intended application. For example, it is easily possible to treat partial amounts of pyrogenic silica with different amounts of a hydrophilic silane and a hydrophobic silane and, by these means, to prepare products, which differ clearly with respect to their dispersability in polar and nonpolar solvents.

The stabilities of the dispersions in different solvents, such as oil/water, ethanol and toluene, permit products to be differentiated distinctly and enable them to be classified with regard to their hydrophilicity and their hydrophobicity. Products, which differ in their dispersion stability are also clearly different in their effectiveness in certain applications, such as freeing oil from oil-saturated packed sand.

The inventive particles or molecules exhibit a pronounced effectiveness at phase boundaries. Provided that their hydrophobic and hydrophilic domains have been selected suitably, they can be used as emulsifiers. With the help of such particles, it is possible, for example, to produce coarse emulsions, which are remarkably resistant to coalescence despite their large droplets. Moreover, a further important property of the inventive particles or molecules arises out of the fact that they can be removed from the emulsified system simply, for example, by filtration, thus breaking the emulsion. The areas of application correspond at least to the teachings of the EP 0 156 270 A2. The particles or molecules can be adapted tailor-made to the desired application.

By adapting the hydrophobic and hydrophilic domains appropriately, the inventive particles or molecules can also act as emulsion breakers. Before they are used, it is advantageous to disperse the particles or molecules finely in a solvent/dispersant. It is particularly advantageous to use the inventive particles or molecules together with known de-emulsifiers. A synergism can frequently be observed here.

The inventive particles or molecules can also contribute to improving the action of known surfactants in forming and stabilizing aqueous foams.

Furthermore, the inventive solids can be used particularly advantageously for the recovery of tertiary crude oil. Especially for flooding methods, they can be added to the surfactant solution and lead to an increased oil removal.

In the following example, the production of different particles corresponding to the invention is shown. In addition, the surface-active properties of these products and their applicability are described.

EXAMPLE 1

A pyrogenic silica (2 g), with a primary particle size of 12 nm and a hydrophobic modification (a methanol number of 40) and 2 g of an untreated, hydrophilic silica with a primary particle size of 12 nm and a methanol number of 0, were dispersed in 50 mL of toluene. The mixture was then sheared for 15 minutes at 8,000 rpm with an Ultraturrax® T 25. After that, the dispersion was allowed to stand for 1 to 2 hours and the particles were filtered off through a fluted filter paper. After subsequent drying in a vacuum drying oven at 100° C., the methanol number ranged from 20 to 25.

EXAMPLE 2

A pyrogenic silica (4 g), with a primary particle size of 12 nm and a hydrophobic modification (a methanol number of 40) and 6 g of an untreated, hydrophilic silica with a primary particle size of 12 nm and a methanol number of 0, were dispersed in 300 mL of toluene. The mixture was then sheared for 15 minutes at 8,000 rpm with an Ultraturrax® T25. After that, the dispersion was allowed to stand for 1 to 2 hours and the particles were filtered off through a fluted filter paper. After subsequent drying in a vacuum drying oven at 100° C., the methanol number ranged from 10 to 14.

EXAMPLE 3

A pyrogenic silica (10 g), with a primary particle size of 12 nm and a hydrophobic modification, which was carried out according to the method described in the DE 34 11 759 A (a methanol number of 40), was dispersed in 300 mL of toluene and mixed with 10 g of an untreated, hydrophilic silica with a primary particle size of 12 nm and a methanol number of 0, which had been dispersed in 200 mL of water. The mixture was then sheared for 1.5 minutes at 8,000 rpm with an Ultraturrax® T25. After that, the emulsion was allowed to stand and the supernatant liquid was filtered off. After subsequent drying in a vacuum drying oven at 100° C., the methanol number ranged from 20 to 25.

EXAMPLE 4

A pyrogenic silica (10 g), with a primary particle size of 12 nm and a hydrophobic modification, which was carried out according to the method described in the DE 34 11 759 A (a methanol number of 40), was dispersed in 300 mL of toluene and mixed with 15 g of an untreated, hydrophilic silica with a primary particle size of 12 nm and a methanol number of 0, which had been dispersed in 200 mL of water. The mixture was then sheared for 15 minutes at 8,000 rpm with an Ultraturrax® T25. After that, the emulsion was allowed to stand and the supernatant liquid was filtered off. After subsequent drying in a vacuum drying oven at 100° C., the methanol number ranged from 10 to 14.

EXAMPLE 5

A pyrogenic silica (10 g), with a primary particle size of 12 nm and a hydrophobic modification, which was carried out according to the method described in the DE 34 11 759 A (a methanol number of 50), was dispersed in 300 mL of toluene and mixed with 2 g of a modified silica, which has a primary particle size of 12 nm and had been hydrophilized with $CH_3O(C_2H_4O)_8$—$Si(OR_1)_3$, (a methanol number of 0), which had been dispersed in 100 mL of water. The mixture was then sheared for 15 minutes at 8,000 rpm with an Ultraturrax® T25. After that, the emulsion was allowed to stand and the supernatant liquids filtered off. After subsequent drying in a vacuum drying oven at 50° C., the methanol number ranged from 25 to 30.

EXAMPLE 6

A pyrogenic silica (10 g), with a primary particle size of 12 nm and a hydrophobic modification, which was carried out according to the method described in the DE 34 11 759 A (a methanol number of 50), was dispersed in 300 mL of toluene and mixed with 2 g of a modified silica, which has a primary particle size of 12 nm and had been hydrophilized with $CH_3O(C_2H_4O)_n(C_3H_7O)_m$–$Si(OR^1)_3$, n being 12 and m being 13 (a methanol number of 0), which had been dispersed in 100 mL of water. The mixture was then sheared for 15 minutes at 8,000 rpm with an Ultraturrax® T25. After that, the emulsion was allowed to stand. After subsequent drying in a vacuum drying oven at 50° C., the methanol number ranged from 30 to 35.

EXAMPLE 7

A pyrogenic silica (10 g), with a primary particle size of 12 nm and a hydrophobic modification, which was carried out according to the method described in the DE 34 11 759 A (a methanol number of 40), was dispersed in 300 mL of toluene and mixed with 10 g of a modified silica, which has a primary particle size of 12 nm and a methanol number of 0 and had been hydrophilized with $CH_3O(C_2H_4O)_8$ $(C_3H_7O)_3$ and been dispersed in 100 mL of water. The mixture was then sheared for 15 minutes at 8,000 rpm with an Ultraturrax® T25. After that, the emulsion was allowed to stand and then dried in a vacuum drying oven at 50° C. The methanol number was 0, that is, the material was wetted completely by water.

EXAMPLE 8

A pyrogenic silica (10 g), with a primary particle size of 12 nm and a hydrophobic modification, which was carried out according to the method described in the DE. 34 11 759 A (a methanol number of 40), was dispersed in 300 mL of toluene and mixed with 2 g of a modified silica, which has a primary particle size of 12 nm and a methanol number of 0 and had been hydrophilized with $CH_3O(C_2H_4O)_n(C_3H_7O)_m$—$Si(OR^1)_3$, n being 12 and m 13, and been dispersed in 100 mL of water. The mixture was then sheared for 15 minutes at 8,000 rpm with an Ultraturrax® T25. After that, the emulsion was allowed to stand and the liquid was then filtered off. After subsequent drying in a vacuum drying oven at 50° C., the methanol number was 0, that is, the material was wetted completely by water.

EXAMPLE 9

A carbon black (10 g, with a methanol number of 50) was dispersed in 200 ml of toluene and treated with 10 g of an untreated, hydrophilic silica with a primary particle size of 12 nm and a methanol number of a 0, which had been dispersed in 200 ml of water. The mixture was then sheared for 15 minutes at 8,000 rpm with an Ultraturrax® T25. After that, the emulsion was allowed to stand and the supernatant liquid was then filtered off. After subsequent drying in a vacuum drying oven at 100° C., the methanol number ranged from 30 to 40.

Application of the Products in Emulsions

The wettability depended on the mixture of the hydrophilic and hydrophobic particles and was reflected in the methanol test. Particle mixtures with a methanol number between 0 and 35 stabilized preferably oil-in-water emulsions, while those with a methanol number between 35 and 60 stabilized water-in-oil emulsions.

EXAMPLE 10

The product of Example 1 was added to 50 g of water and a layer of 50 ml of paraffin of low viscosity was placed over it. An emulsion was prepared from this by stirring with an Ultraturrax T 25 stirrer and poured into a 100 ml measuring cylinder for determining the amount of emulsion. A W/O emulsion (80 ml) was formed, the disperse phase of which sedimented to the surface because of the density differences. Separation of oil was not observed.

EXAMPLE 11

The product of Example 4 (2 g) was added to 50 g of water and a 50 ml layer of paraffin of low viscosity was placed over it. An emulsion was prepared from this by stirring with an Ultraturrax® T 25 stirrer and poured into a 100 ml measuring cylinder for determining the amount of emulsion. A stable O/W emulsion was formed Separation of oil was not observed.

Application of the Products in Polyurethane Foam Formulations

EXAMPLE 12

The products were stirred into the following polyurethane formulation and foamed:

Stirrer type: H-drive with relay circuit for monitoring stirring time and stirring rate.

Stirring conditions: pre-stirring phase of one minute at 1,000 rpm, all materials being stirred with the exception of the diisocyanate. This was followed by the main stirring phase of 7 seconds at 2500 rpm with addition of the diisocyanate.

Stirrer design: disk stirrer with a disk diameter of 5.8 cm and 8 half moon-shaped, identical depressions with a diameter of 1 cm, which were distributed uniformly in the disk and directed downward.

| | |
|---|---|
| Polyol | 400 g |
| Water | 16 g |
| DMEA | 0.8 g |
| K29 | 0.8 g |

| | | | |
|---|---|---|---|
| T80 | 194.4 g | | |
| Tegostab ® BF 2370 | 1.6 g | | |
| Product | 1% by weight based on the polyol | | |

In the above:
Polyol is a triol with a molecular weight of 3,500
DMEA is dimethylethanolamine
K29 is tin(II) octoate
T80 is toluene diisocyanate (80% 2,4 TDI, 20% 2,6 TDI)

| | Production | Collapse | |
|---|---|---|---|
| Silica A200 | dry | collapse | 1% by weight used |
| Silica A202 | dry | 9.7 cm | 1% by weight used |
| HDK 2000 | dry | collapse | 1% by weight used |
| Product from Example 1 | toluene | 3.5 | 2% by weight used |
| Product from Example 2 | toluene | 3.4 | 2% by weight used |
| Product from Example 3 | toluene/water | 1.8 | 2% by weight used |
| Product from Example 4 | toluene/water | 2.2 | 2% by weight used |
| Silica type A200/A972 50/50 mixture | dry stirred | 3.9 | 2% by weight used |
| Silica type A200/A972 60/40 mixture | dry stirred | 5.1 | 2% by weight used |
| Blank values (without addition) | | 2.7 | |

The products were tested with respect to their stabilizing action in this boundary-stable formulation. A stabilizing effect of the inventive particles, which were obtained at the boundary surface between water and toluene, can be seen clearly and manifests itself in a lesser collapse of the foam.

What is claimed is:

1. Essentially water-insoluble amphiphilic particles composed of first and second moieties, one of said first and second moieties, having predominantly hydrophilic domains while the other of said first and second moieties has predominantly hydrophobic domains, said moieties being distributed anisotropically over their surface and having a particle size ranging from 1 nm to 100 μm, said first and second moieties being agglomerated or associated over polar interactions or hydrogen bridges.

2. The particles of claim 1, wherein said one moiety comprises predominantly hydrophically modified silicas while the other moiety comprises predominantly hydrophobically modified silicas.

3. The particles of claim 1, wherein both moieties comprise polyalkylsilsesquioxanes.

4. The particles of claim 3, wherein both moieties are comprised of polymethylsilsesquioxanes.

5. The particles of claim 1 wherein the predominantly hydrophilic moiety comprises silica while the predominantly hydrophobic moiety comprises polyalkylsilsesquioxanes.

6. Particles or molecules of claim 1, wherein the predominantly hydrophilic moiety consists of starch or other carbohydrates.

7. Particles or molecules of claim 1 wherein the predominantly hydrophobic domains are formed by hydrocarbon groups.

8. Particles or molecules of claim 7 wherein the hydrocabon groups comprise substituted or unsubstituted alkyl or aryl groups.

9. Particles or molecules of claim 1, wherein the hydrophobic domains are formed by organosilicon compounds with $R^6$ and $\equiv SiOR^1$ structural units, in which $R^6$ is an alkyl group with more than 3 carbon atoms, an aryl group or an alkaryl group or a polysiloxanyl group.

10. Particles or molecules of claim 9, wherein the organosilicon compounds are silanes of the formula $$R^7_c R^2_d Si(OR^1)_{4-(c+d)}$$

in which $R^7$ is an alkyl group with more than 3 carbon atoms, an aryl group or an alkaryl group, c=1 or 2, d=0 or 1, c+d=1, 2, or 3, or organopolysiloxanes with at least —$OR^1$ group.

11. Particles or molecules of claim 1, wherein the hydrophobic domains are formed by compounds of the formula $$R^7 COCl.$$

12. Particles or molecules of claim 1, wherein the predominantly hydrophilic moieties and the hydrophobic moieties are linked to the particle matrix by a —CO—, —SiO—, —COO—, —NHCOO— or —NHCO— bond.

13. The surface-active product for stabilizing and de-stabilizing emulsions or foams, in suspension polymerization for encapsulation as well as for tertiary oil recovery, said products corresponding to the structure of claim 1.

14. The method for preparing particles or molecules having first and second moieties, one of that first and second moieties having predominantly hydrophilic domains while the other of that first and second moieties has predominantly hydrophobic domains, said moieties being distributed anisotropically over their surface and having a particle size ranging from 1 nm to 100 μm, said first and second moieties being agglomerated or associated over polar interactions or hydrogen bridges, and said moieties are brought into contact with one another at a phase boundary.

15. The method of claim 14, wherein the reaction is carried out at a phase boundary of water and an organic solvent or dispersant, particularly an aliphatic or aromatic hydrocarbon.

16. The method of claim 15, wherein silicas are brought into contact with one another by the action of shear forces.

17. The method of claim 16, wherein the shear forces are generated by stirrers operating according to the rotor-stator principle.

* * * * *